May 22, 1928.  1,670,444
J. R. GAMMETER
METHOD AND APPARATUS FOR MAKING PNEUMATIC TIRES
Filed June 7, 1926    4 Sheets-Sheet 3

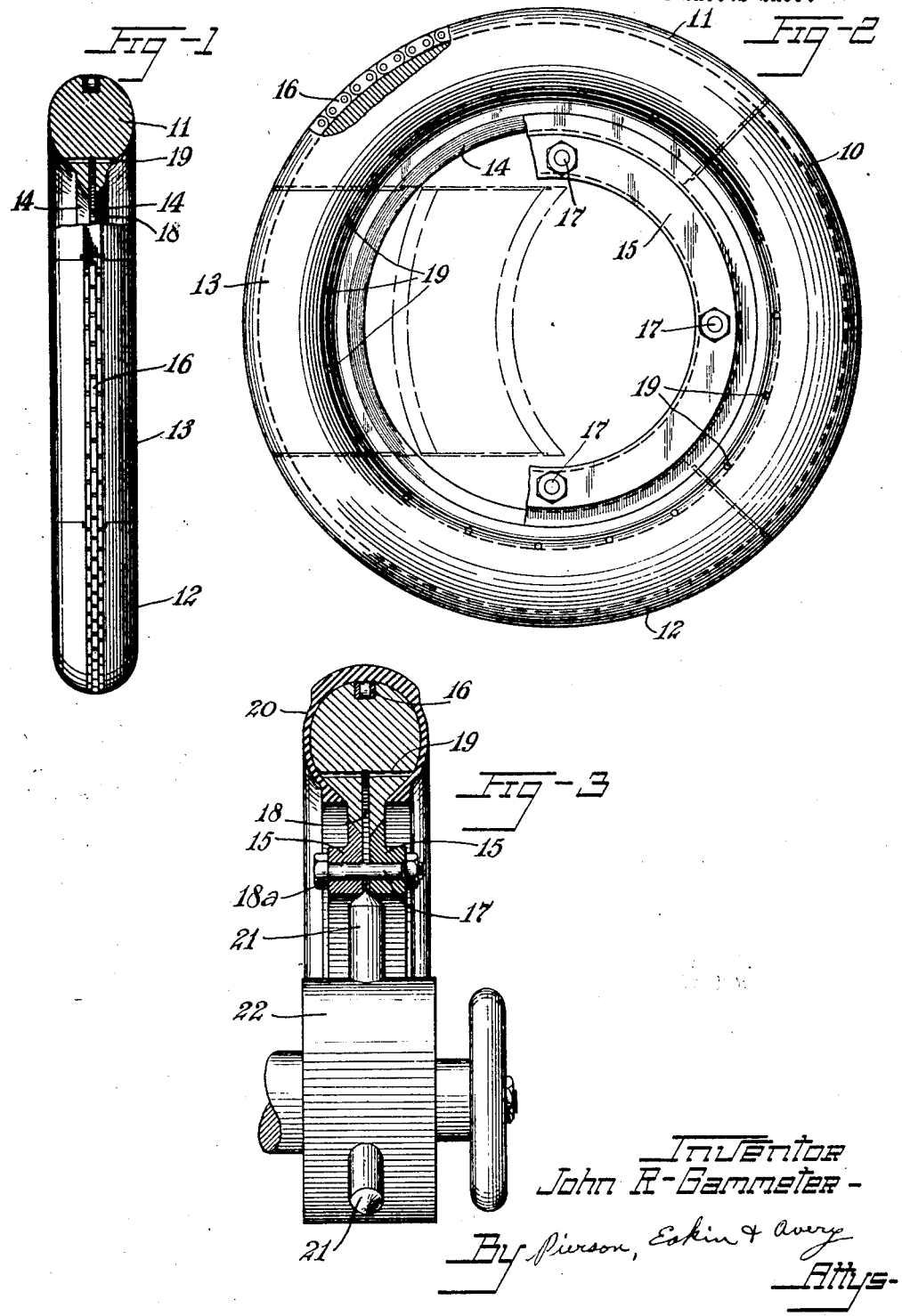

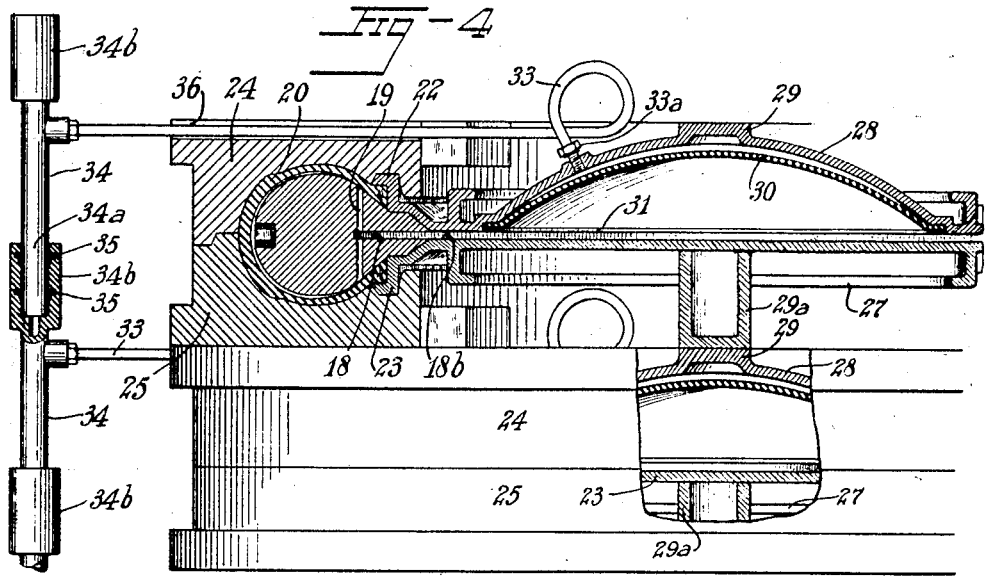
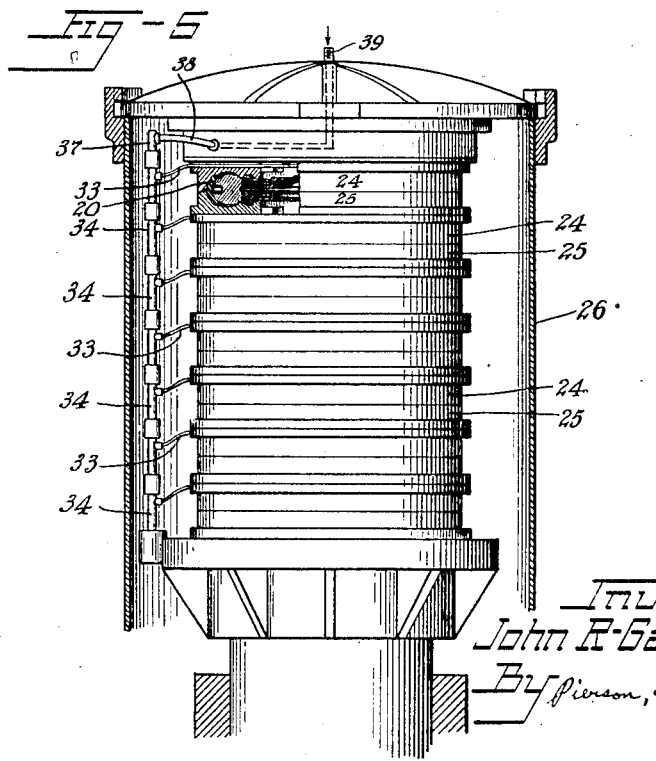

Inventor
John R. Gammeter
By Pierson, Eakin & Avery
Attys-

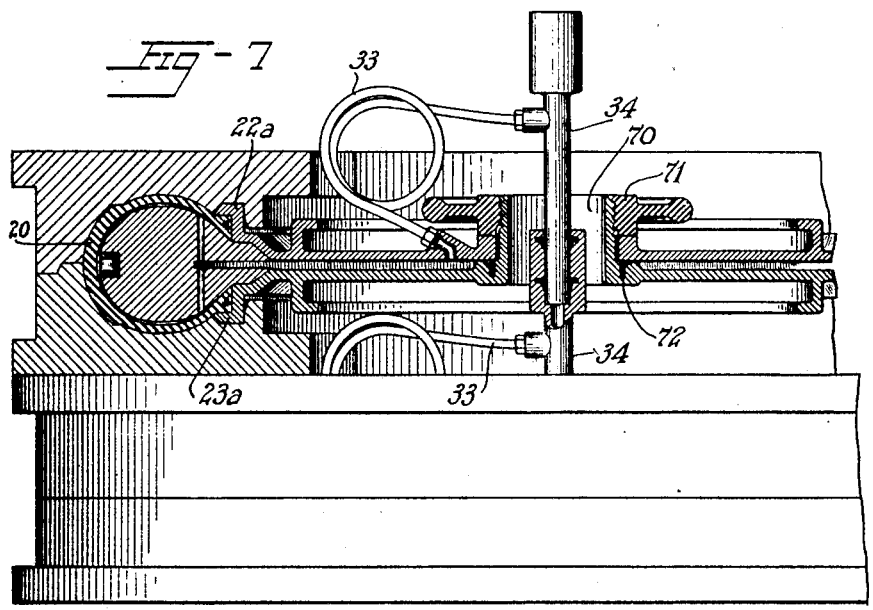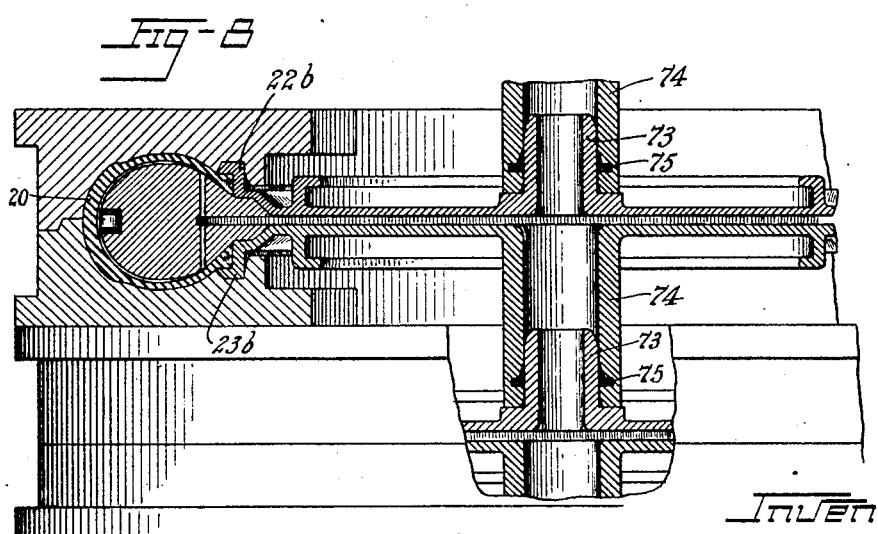

Patented May 22, 1928.

1,670,444

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING PNEUMATIC TIRES.

Application filed June 7, 1926. Serial No. 114,053.

This invention relates to methods and apparatus for making pneumatic tires and its chief objects are economy of vulcanizing equipment, to obtain a highly compacted tire without maintaining a high fluid pressure thereon through multiple-jointed connections during cure, and to obtain the superior wear-resisting properties which have been found to exist in rubber articles vulcanized in direct contact with water at high pressure.

Of the accompanying drawings:

Fig. 1 is an edge-wise elevation of a tire core embodying and adapted to carry out a part of my invention, a part being sectioned and broken away.

Fig. 2 is a face view of the same, with a part sectioned and broken away.

Fig. 3 is a fragmentary sectional view of the core mounted upon the chuck of a tire-building machine and a tire mounted upon the core.

Fig. 4 is a fragmentary elevation of two tire molds with the work therein and apparatus for distending the tires in the molds, one of the molds being shown in section.

Fig. 5 is a vertical section of a vulcanizer having a stack of the mold assemblies therein.

Fig. 7 is a fragmentary elevation of two tire molds with the work therein and apparatus of a modified type for distending the tires in the molds, one of the molds being shown in section.

Fig. 8 is a similar view showing another modification.

Figure 6:
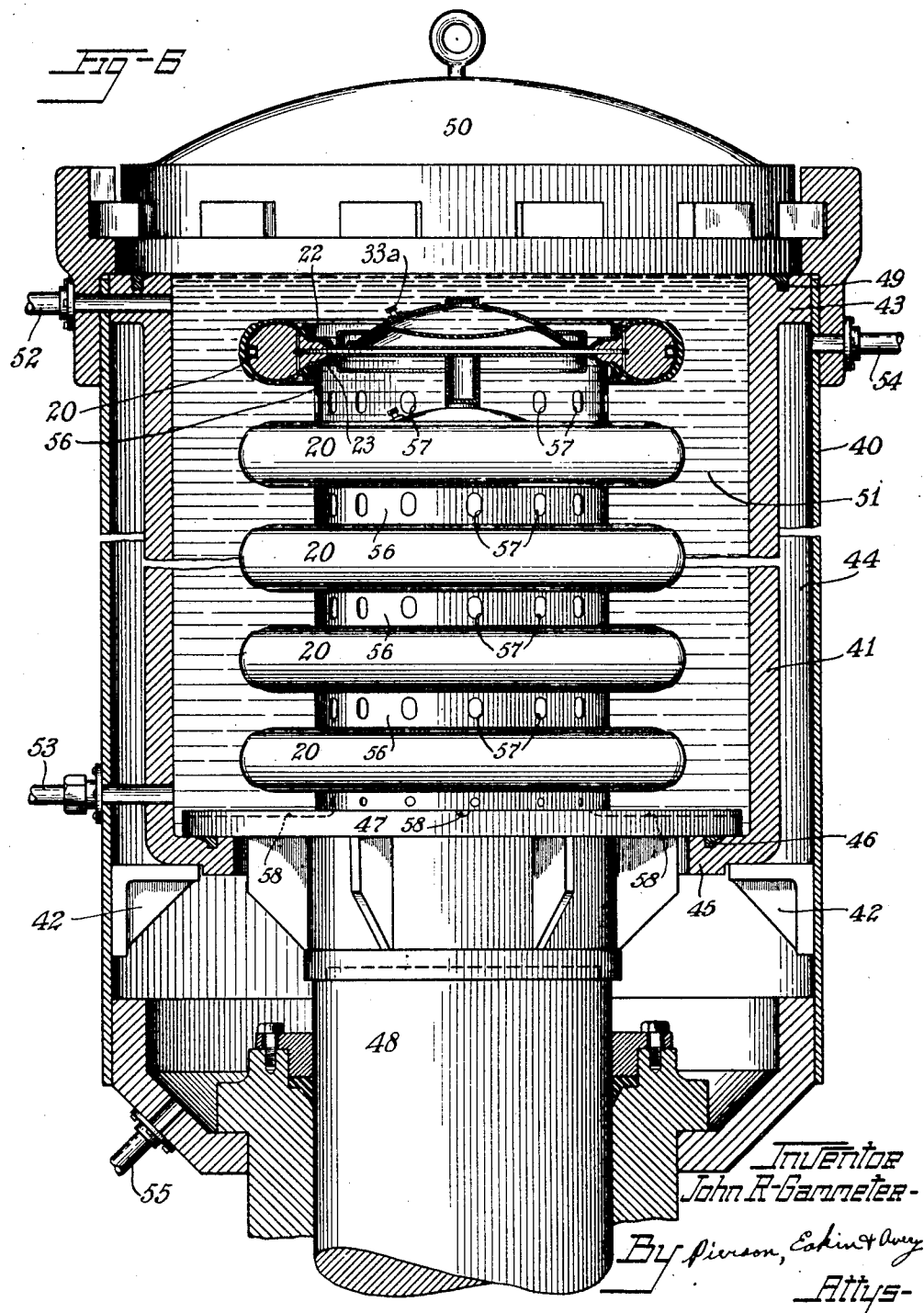
Fig. 6 is a vertical section of a vulcanizer adapted for a second vulcanization of the tires, with a stack of the tires and their mountings therein.

Referring to the drawings, the preferred type of core for the building of the tire is shown clearly in Figs. 1 to 3 and comprises core sections 10, 11, 12 and 13 formed with interlocking ends and adapted to be assembled to form a complete annular core, the section 13 meeting the adjacent sections 11 and 12 on parallel lines such that the section 13 may be moved radially inward to the position indicated by the dotted lines in Fig. 3 to remove it, as a key section, from a tire mounted upon the core. The tongue portions of the core sections are formed with inwardly converging beveled faces such as the faces 14, 14, Fig. 1, adapted to receive and interfit with complementally beveled faces of annular clamping rings 15, 15 (see Fig. 3), for ready assembly and accurate registry of the core sections. The sections are formed at their tread portions with respective grooves adapted collectively to provide a complete annular groove extending longitudinally about the tread portion of the core to receive an endless chain 16 which is provided for holding the core sections against the outward radial thrust of the beveled clamping rings 15, 15 in the clamping of the latter upon the tongue portions of the core sections, for which clamping bolts such as the bolts 17, 17 are provided.

Each core section is formed from end to end with a slot 18 extending from the inner limit of its tongue to a line somewhat above its bead receiving portion, the said slot communicating with transverse passages 19, 19, extending transversely through the core section, and the tongue portions of the core sections and the clamping rings 15 are so interfitted that the clamping rings stand apart, after being drawn up by the bolts 17, leaving between them a space 18ª adapted to receive the points of the arms 21 of a tire-building machine chuck 22 (Fig. 3), to center the core assembly thereon. The slots 18 and passages 19 together constitute a channel system adapted, in conjunction with apparatus hereinafter described, to conduct a liquid or plastic tire-distending substance from the inner periphery of the core assembly to the space between the core and a tire 20 built thereon, to stretch the tire away from the core and distend it in a mold.

After the tire has been built upon the core the rings 15 are removed and the rest of the assembly is mounted in a mold and the tire is distended against the mold by a substance forced in between the core sections and the tire through the slots 18 and passages 19, the said substance preferably being of such character as to hold the tire in its distended condition after the injecting pressure upon the substance is released. A hard-setting substance such as plaster of Paris suitably mixed with water may be employed for this purpose, but I prefer to employ clay plasticized with water or with glycerine to a suitable consistency, or mica plasticized with glycerine, for economy of material and labor. I find that when the plastic is forced into the tire with sufficient pressure the pressure causes it to pack or set so that it is less easily flowable than during its injection into the tire and will assume a stiffness such as to prevent the tire from expelling the contained substance and returning to its original size upon the release of the injecting pressure, especially when the tire is mounted upon a tire-building core, so that the material is in the form of a comparatively thin layer, and the substance readily may be reworked for repeated use.

In the partial vulcanizing of the tire, the clamping rings 15 being removed from the core assembly after the tire has been built thereon, and the tire itself preventing the core sections from becoming displaced therein, a pair of clamping members such as are shown at 22, 23, Fig. 4, are put on in place of the rings 15, mold sections 24, 25 are applied to the tire and clamping members as shown clearly in Fig. 4, and a stack of the mold assemblies are mounted in a heater 26 as shown in Fig. 5. The clamping members are so formed as to stand apart, to provide a space or passage $18^b$ between them in continuation of the passages 18 of the core sections.

Referring to Fig. 4, the clamping member 23 is of imperforate, disk-like form having an annular strengthening rib 27 on its lower face, and is so formed as to extend about and mold the bead of the tire from the toe of the bead to a line well above the heel of the bead, so that the bead of the tire will act valvularly against the clamping member in the manner of a lip gasket, under the pressure of the fluid or plastic distending medium within the tire.

The clamping member 22 is of the same form as the member 23 except that its central portion is rounded in the form of a dome 28 having a boss 29 the latter being abutted by the lower end of a spacer block $29^a$ secured to the lower face of the central, disk-like portion of the clamping member 23 of the next higher mold assembly in the series to prevent distortion of the said disk-like portion under the force of a distending medium enclosed between the two clamping members.

Within the dome-like portion 28 of the upper clamping member is a flexible diaphragm 30 having its annular margin secured and sealed to the said clamping member 22, as by an annular clamping ring 31, so that the forcing downward of the diaphragm 30 will cause a distending medium enclosed between the two clamping members to be forced out through the slots 18 and passages 19 of the core sections to lift the tire from the core and expand it against the mold, the clamping members 22 and 23 being so formed, as above described, as to stand apart at the inner periphery of the core when they are in clamping position upon the core.

For forcing the diaphragm downward, the dome-like portion 28 of the upper clamping member 22 of each pair has mounted in and transversing its wall a detachable coupling $33^a$ for a flexible pipe 33 leading from a manifold, which latter may consist of a series of sections 34, 34 each formed at one end with a male coupling portion $34^a$ and at the other end with a female portion $34^b$, the latter being provided with lip gaskets 35, 35, and each of the sections being adapted to be handled as a unit with the clamping member 22 to which its flexible pipe 33 leads, and the several sections being adapted to be assembled as the trunk conduit of a manifold in the mounting of the mold assemblies in the vulcanizer, the upper face of each mold section 24 being traversed by a groove 36 to accommodate the flexible pipe 33.

As shown in Fig. 5 the conduit or manifold, consisting of the sections 34, is provided at its upper end with a male coupling member 37 mounted upon the end of a flexible pipe 38 which has its other end mounted in the cover of the vulcanizer in communication with a pipe 39 projecting from the upper face of the cover, the pipe 39 being adapted to be connected with a suitable source of pressure fluid, for conducting a pressure fluid such as air or water into the spaces between the respective diaphragms 30 and dome portions 28 of the several mold assemblies.

The apparatus for vulcanizing the tires in contact with water after they are removed from the molds is shown in Fig. 6, wherein a vulcanizer 40 is provided with an inner sleeve-like casing 41 supported by brackets 42, 42 attached to the inner wall of the vulcanizer, the upper end of the casing 41 being formed with an external, annular, spacing flange 43 fitting within and sealed against the wall of the vulcanizer, so that the main body of the casing 41 stands away from the wall of the vulcanizer to provide an annular steam chamber 44.

The casing 41 is formed at its lower end with an internal annular flange 45 having a lip gasket 46 inserted in its upper face and adapted to seal against the under face of the margin of the head 47 of the ram 48 of the vulcanizer, and an annular lip gasket 49 is set in the upper face of the casing 41 and is adapted to seal against the cover 50 of the vulcanizer, so that the casing 41, ram head 47, and cover 50 are adapted to enclose an inner, water chamber 51, within the vulcanizer, when the ram is lowered and the cover is in place.

Pipes 52 and 53 are mounted in and traverse the walls of the vulcanizer and the inner casing 41, for circulation of water through the inner chamber 51, and pipes 54, 55 are provided for circulating steam through the outer chamber 44 to maintain the water at vulcanizing temperature.

For supporting the stack of tires 20 out of contact with each other upon the ram, spacer rings 56, 56 each formed with apertures 57 to permit the water to enter the stack are interposed between successive tire assemblies, the rings 56 being of such diameter as to engage the clamping members 22, 23 of the tire assemblies. The upper face of the ram head 47 may be formed with radial grooves 58, 58 to facilitate the circulation of water through the stack of tires when free passage of water vertically through the stack is permitted as in the case of the employment of the modified type of bead clamping equipment shown in Fig. 7.

In the preferred practice of my invention the tires are built upon the core assemblies as shown in Fig. 3, the core sections being supported in assembled relation as there shown, after which the clamping rings 15 are removed from the core sections and the tires with the cores therein are assembled with the clamping members 22, 23, each of the members 22 being filled, on the open side of the diaphragm 30, with plastic clay. The mold sections are then applied to the tires and a stack of the mold assemblies are mounted in the vulcanizer as shown in Fig. 5, the ram being lowered in the usual manner as the stack of mold assemblies is built up, and the manifold sections 34 of the respective mold assemblies being built up at the same time, after which the manifold is connected, through the pipes 38 and 39, with a suitable source of pressure fluid and, the lid of the vulcanizer being closed, the stack of tires in their molds is subjected to a partial vulcanization by circulating steam through the vulcanizing chamber. At the beginning of this vulcanizing operation pressure fluid is applied through the manifold to the upper surfaces of the several diaphragms 30, forcing the latter downward and injecting the plastic clay from the space between the clamping members 22, 23 and through the channels 18 and passages 19 into the space between the cores and the tires, distending the tires against the molds to impart a suitable stretch to the cords of the tires and to cause them to be shaped, with the usual tread designs, against the enclosing molds.

As soon as the tires have been subjected to sufficient vulcanization to cause them to set, the vulcanizer is opened and the tires are removed from the molds, while the clamping members 22, 23 are left in place upon them. The pipes 33 are disconnected from the respective dome portions 28 of the members 22 and the tire assemblies are stacked in another vulcanizer as shown in Fig. 6 and the vulcanization is completed by circulating water at vulcanizing temperature and under high pressure through the inner chamber 51 of the vulcanizer, in contact with the exterior surfaces of the tires.

During this final vulcanization of the tires they are held in their expanded condition by the clay previously forced into the space between the tire and the core, the high pressure with which the clay is injected together with the heat of the preliminary vulcanizing step causing the clay to become sufficiently stiff to resist expulsion from the said space, and the fluid pressure upon the diaphragms 30 counterbalancing the fluid pressure upon the outer surfaces of the tires. The high pressure of the water in contact with the outer surfaces of the tires apparently assists to prevent flow of the rubber of the tires during the final vulcanization period and permits the application of a desirable compacting pressure to the tires throughout such period, and as the tires are thus compacted by direct fluid pressure the pressure is equal at all fluid-contacting parts of the tire and the cords of the tire are permitted freely to adjust themselves to natural and desirable positions in the tire.

At completion of the final vulcanization period the tires are removed from the vulcanizer and from the apparatus by which they are enclosed, the clay is removed from the tires and cores for re-use, and the operation as described is repeated.

In the type of apparatus shown in Fig. 7 the clamping members for engaging the beads of the tire during the preliminary cure are formed with a central passage 70 to admit the manifold sections 34, the bead clamping members 22$^a$, 23$^a$ are of flat form and those of each pair are adapted to be clamped and sealed together about the central passage 70 by means of a wheel nut 71 and a gasket 72. The diaphragms are omitted and the flexible pipe 33 of the manifold communicates directly with the space between the two clamping members, this construction being adapted for impelling the distending material from a suitable source through the manifold.

In the modification shown in Fig. 8, the upper clamping member 22$^b$ of each tire is formed with an upwardly projecting male coupling member 73 and each lower clamping member 23$^b$ is formed with a downwardly projecting female coupling 74 provided with an internal lip gasket 75, the said coupling members being adapted to provide a manifold conduit by being brought into mated relation by the mounting of the successive mold assemblies in the stack.

As an alternative to partially vulcanizing the tires in the molds they may be merely molded therein without substantial vulcanization, or they may be completely vulcanized in the molds, especially in the case of tires of the smaller sizes, which do not require a long period of vulcanization, in which case, although the economy of mold equipment incident to the specific procedure above described is of course not obtained, economy is effected in avoiding the use of expansible cores, the plastic material being adapted to expand the tires without penetrating them and thus causing ply-separation and other defects such as result from the use of water as the distending medium.

An advantage of building the casing upon a core and then expanding it from the core by injecting the plastic material is that the entrapping of air, such as to cause ply separation by reason of the entrapped air's passage through and consequent failure to expand the inner plies, is avoided, the core occupying substantially all of the interior of the casing prior to the injection of the plastic, so that the casing does not contain any substantial quantity of air to be entrapped therein.

Other modifications may be resorted to within the scope of my invention and I do not wholly limit my claims to the specific procedure or construction described.

I claim:

1. The method of making a tire casing which comprises building the casing, distending the casing with a distending medium adapted to assume such consistency as to prevent retraction of the casing upon release of the distending pressure upon the medium, and subjecting the casing to vulcanization with its outer surface in direct contact with a liquid under pressure.

2. A method as defined in claim 1 in which the tire casing is shaped in a mold prior to the vulcanization step defined.

3. The method of making a tire casing which comprises building the casing upon a core, enclosing the casing and core in a mold, distending the casing against the mold by conducting a flowable material under pressure into the space between the core and the casing, removing the casing and core from the mold, and subjecting the casing to vulcanization in its distended condition and with its outer surface in direct contact with a pressure fluid.

4. A method as defined in claim 3 in which the casing is formed with a tread design and partially vulcanized in the operation of distending it against the mold.

5. The method of making a tire casing which comprises building the casing upon a core, distending it from the core by conducting a plastic material under pressure into the space between the core and the casing, and subjecting the casing to vulcanization while it is so immersed in a fluid under pressure that the pressure of the fluid upon the exterior of the casing, urging it to retract, is counterbalanced by the pressure of the fluid upon the plastic material within the casing, urging it to expand.

6. A method as defined in claim 5 in which water-softened clay is employed as the plastic distending material.

7. Tire-making apparatus comprising a sectional core formed with oppositely beveled faces on the tongue portions of the sections and a pair of bead-clamping members adapted to interfit with said beveled faces, to embrace the bead portions of a tire-casing mounted upon the core, and to define between them a conduit space at the inner periphery of the core, the core being formed with a passage communicating with the said space and with the outer surface of the core.

8. Tire-making apparatus as defined in claim 7 in which the conduit space is divided into two compartments by a flexible diaphragm and means is provided for conducting a pressure fluid into the compartment upon one side of the diaphragm to flex the latter and thereby force material from the other compartment into the tire casing.

9. Tire-making apparatus comprising a bead separating member adapted to fit between the bead portions of a tire casing, a pair of bead-clamping members adapted to embrace the respective bead portions of the tire to clamp them against the said member and to enclose a conduit space at the inner periphery of the tire, and a pair of mold members adapted to be freely mounted upon and removed from the tire, bead separating member and bead-clamping member assembly.

10. Tire vulcanizing apparatus comprising a mold for the tire, a tire-building core, a mass of plastic material, and means for forcing the said material between the core and the tire.

11. Tire-vulcanizing apparatus comprising a mold for the tire, a tire-building core, a mass of plastic material adapted to be forced between the core and the tire to distend the latter in the mold and to remain appreciably plastic within the tire during the vulcanization of the latter, and means for forcing the said material between the core and the tire.

12. The method of making a tire casing which comprises building the casing upon a core and expanding it from the core by injecting a plastic material between the two.

13. The method of making tire casings which comprises building successive casings upon cores and expanding them from the cores by injecting plastic material between the casing and the core, the said plastic material being repeatedly so used without being caused completely to lose its plasticity.

14. The method of making a tire casing which comprises building the casing, distending the casing by injecting thereinto a plastic material comprising clay, and vulcanizing the casing in its resulting distended condition.

15. The method of making a tire casing which comprises building the casing, distending the casing by injecting into it a plastic material and by pressure upon the said material so stiffening it that it will hold the casing in a distended condition independently of the injecting pressure, and subjecting the casing to vulcanization while it is held distended by the said material, the plastic material comprising clay having been rendered less plastic prior to the completion of the vulcanizing operation.

16. Tire vulcanizing apparatus comprising a mold for the tire, an initially plastic mass of material comprising clay, and means for forcing the said material into the tire under pressure while the tire is in the mold.

In witness whereof I have hereunto set my hand this 3rd day of June, 1926.

JOHN R. GAMMETER.